(12) United States Patent
Williams

(10) Patent No.: US 7,853,521 B2
(45) Date of Patent: *Dec. 14, 2010

(54) GLOBAL POSITIONING SYSTEM TO MANAGE RISK FOR POS TERMINAL

(75) Inventor: Charles Williams, Pearland, TX (US)

(73) Assignee: The Western Union Company, Englewood, CO (US)

(*) Notice: Subject to any disclaimer, the term of this patent is extended or adjusted under 35 U.S.C. 154(b) by 1061 days.

This patent is subject to a terminal disclaimer.

(21) Appl. No.: 10/746,557

(22) Filed: Dec. 23, 2003

(65) Prior Publication Data

US 2005/0149438 A1    Jul. 7, 2005

(51) Int. Cl.
*G06Q 40/00*    (2006.01)
*G06K 5/00*    (2006.01)

(52) U.S. Cl. .......................... 705/39; 235/379; 235/380

(58) Field of Classification Search .................. 705/1, 705/16, 17, 35, 40, 42, 44; 235/379, 380; 455/406, 458, 456.2, 456.6
See application file for complete search history.

(56) References Cited

U.S. PATENT DOCUMENTS

| | | | |
|---|---|---|---|
| 5,679,938 A | 10/1997 | Templeton et al. | |
| 5,679,940 A | 10/1997 | Templeton et al. | |
| 5,930,777 A | 7/1999 | Barber | |
| 6,233,448 B1 | 5/2001 | Aperovich et al. | |
| 6,259,405 B1 | 7/2001 | Stewart et al. | |
| 6,442,532 B1* | 8/2002 | Kawan | 705/36 R |
| 6,505,772 B1 | 1/2003 | Mollett et al. | |
| 6,509,828 B2* | 1/2003 | Bolavage et al. | 340/10.1 |
| 6,510,418 B1 | 1/2003 | Case et al. | |
| 6,547,132 B1 | 4/2003 | Templeton et al. | |
| 6,581,043 B1 | 6/2003 | Wallin et al. | |
| 6,612,488 B2* | 9/2003 | Suzuki | 235/380 |

(Continued)

FOREIGN PATENT DOCUMENTS

JP    9204480    * 8/1997

(Continued)

OTHER PUBLICATIONS

Clarke, Roger; "Person location and person tracking: Technologies, risks and policy implications"; V14,n2; Information Technology & People; 2001; pp. 1-25.*

(Continued)

*Primary Examiner*—Ella Colbert
(74) *Attorney, Agent, or Firm*—Sutherland Asbill & Brennan LLP

(57) ABSTRACT

The present teachings describe a system for processing financial transactions. In one embodiment, the system includes a remote terminal adapted to identify the location of financial transactions via global positioning system (GPS) information such that the remote terminal acquires transaction information from a user and transmits a first signal indicative of transaction information and GPS information. In addition, the system includes an authorizing host adapted to receive the first signal transmitted by the remote terminal such that the authorizing host evaluates the risk associated with financial transactions based, at least in part, on the GPS information so as to determine whether to accept or decline the financial transaction. The present teachings further describe devices and methods of acquiring GPS information for the purpose of managing risk for financial transactions.

58 Claims, 7 Drawing Sheets

U.S. PATENT DOCUMENTS

| | | | |
|---|---|---|---|
| 6,615,186 B1 * | 9/2003 | Kolls | 705/26 |
| 6,850,252 B1 * | 2/2005 | Hoffberg | 715/716 |
| 6,948,656 B2 | 9/2005 | Williams | |
| 7,103,575 B1 * | 9/2006 | Linehan | 705/64 |
| 7,152,788 B2 | 12/2006 | Williams | |
| 7,200,566 B1 * | 4/2007 | Moore et al. | 705/26 |
| 7,376,583 B1 * | 5/2008 | Rolf | 705/17 |
| 2001/0049636 A1 * | 12/2001 | Hudda et al. | 705/26 |
| 2002/0016763 A1 * | 2/2002 | March | 705/39 |
| 2002/0025796 A1 * | 2/2002 | Taylor et al. | 455/406 |
| 2002/0087478 A1 * | 7/2002 | Hudd et al. | 705/64 |
| 2002/0095357 A1 * | 7/2002 | Hunter et al. | 705/27 |
| 2002/0143638 A1 * | 10/2002 | August et al. | 705/26 |
| 2002/0143655 A1 * | 10/2002 | Elston et al. | 705/26 |
| 2003/0093368 A1 | 5/2003 | Manfre et al. | |
| 2003/0120609 A1 * | 6/2003 | Balagion et al. | 705/64 |
| 2003/0130919 A1 | 7/2003 | Templeton et al. | |
| 2003/0135463 A1 * | 7/2003 | Brown et al. | 705/44 |
| 2003/0216987 A1 | 11/2003 | Mollett et al. | |
| 2003/0216988 A1 | 11/2003 | Mollett et al. | |
| 2003/0217014 A1 | 11/2003 | Mollett et al. | |
| 2003/0225686 A1 | 12/2003 | Mollett et al. | |
| 2003/0236755 A1 * | 12/2003 | Dagelet, Jr. | 705/68 |
| 2004/0122685 A1 * | 6/2004 | Bunce | 705/1 |
| 2004/0236688 A1 * | 11/2004 | Bozeman | 705/42 |
| 2005/0133588 A1 * | 6/2005 | Williams | 235/379 |
| 2005/0144106 A1 * | 6/2005 | Eder | 705/36 |

FOREIGN PATENT DOCUMENTS

| | | |
|---|---|---|
| WO | WO 01/197134 A1 | 12/2001 |
| WO | WO 03/042790 A2 | 5/2003 |
| WO | WO 03/083751 * | 10/2003 |
| WO | WO 03/083751 A1 | 10/2003 |

OTHER PUBLICATIONS

EFT Report; "IVI Checkmate expands POS grasp terminal maker scoops up DataCard Unit"; Apr. 21, 1999; vol. 22, Issue 8; pp. 1-3.*

Disclosure Under 37 CFR § 1.56 as filed Jul. 21, 2008.

Supplemental Disclosure Statement Under 37 C.F.R. § 1.56 for U.S. Appl. No. 10/746,557.

* cited by examiner

GLOBAL POSITIONING SYSTEM TO MANAGE RISK FOR POS TERMINAL

BACKGROUND OF THE INVENTION

1. Field of the Invention

The present invention relates to financial transactions and, in particular, to a system and method of risk assessment, whereby global positioning system (GPS) information is acquired for validation of financial transactions.

2. Description of the Related Art

A typical financial transaction involves a form of payment in exchange for goods and services at a point of sale. In most instances, a customer provides the form of payment, such as a check draft or credit card requisition, to a merchant in exchange for the goods and services. The check draft and the credit request are often regarded as non-cash promissory payments that instruct the customer's bank or credit guarantor to pay the merchant the amount requested by the customer. In some situations, the funds promised to the merchant by the check draft or credit request may not be paid due to reasons such as insufficient funds in the customer's checking account, account delinquency, or fraud. As a result, the merchant may be susceptible to risk when a check draft or credit card requisition is received as payment for goods and services.

Some merchants choose to manage risk by subscribing to a payment approval agency that assesses the risk associated with proffered promissory payments. For a given financial transaction, a subscribed merchant sends a transaction approval request to the agency with information, such as the payment amount and the method of payment identifying information. The agency assesses the risk and generates a risk score based on the information received. The agency then either approves or declines the transaction based on the generated risk score. The level of subscription to such an agency may vary, wherein the agency may assume the risk of the transaction by either guaranteeing the check or purchasing the check from the merchant. Thus, it is in the interest of the agency to accurately assess the risks associated with financial transactions.

As is understood, the risk of a particular transaction is often based upon the physical location at which the sale is taking place. In some areas, the likelihood that a proffered promissory payment will not be backed by sufficient funds, or will be otherwise fraudulent, is increased. Hence, risk assessment agencies typically want to know the physical location of the store front that is requesting the risk assessment of the proffered payment as that physical location is an important variable in determining risk score.

Generally, merchants are equipped with a store front transaction device which is communicatively linked to the risk assessment agency. These transaction devices have the ability to transmit information about the proffered promissory payment to the risk assessment agency as well as information that identifies the merchant. However, many of these transaction devices are portable and merchants may physically move their store location or the location of the transaction device. In this circumstance, the risk factors of accepting a proffered promissory payment may have changed as a result in the change in location without the risk assessment agency being aware of the change.

One particular circumstance where this problem occurs involves travelling merchants. Many merchants travel from location to location to sell products. An example of such a merchant includes those who sell crafts at state fairs and craft shows. The location of the sales transactions can vary quite widely within towns or states or even between states. Some of these merchants may wish to accept proffered promissory payments and may have a transaction device that they can connect to the risk assessment agency via telephone, cellular telephone or the like. In these circumstances, the risk of accepting checks or other proffered promissory payments can vary quite significantly based on location and the risk assessment agency generally does not have the ability to determine where the travelling merchant is located.

Based on the foregoing, there is a need for an improved method and system for assessing the risk of accepting a proffered promissory payment To this end, there is a need for a system and method that is capable of discerning the physical location at which the transaction is occurring such that the risk assessment can take this factor into account when determining the risk of accepting the proffered promissory payment.

SUMMARY OF THE INVENTION

The aforementioned needs may be satisfied by a system for processing financial transactions comprising, in one embodiment, at least one remote terminal that identifies the location of a financial transaction, wherein the remote terminal also acquires transaction information about a proffered promissory payment and transmits a signal indicative of the transaction information and the location information. In addition, the system comprises an authorizing host that receives the signal transmitted by the remote terminal wherein the authorizing host evaluates the risk associated with the financial transaction based, at least in part, on the location information so as to determine whether to accept or decline the financial transaction, and wherein the authorizing host transmits a signal back to the remote terminal indicative of acceptance or decline of the proffered promissory payment.

The aforementioned needs may also be satisfied by a system for processing financial transactions comprising, in one embodiment, at least one remote terminal that identifies the location of a financial transaction with a GPS signal, wherein the remote terminal also acquires transaction information about a proffered payment and transmits a signal indicative of the transaction information and the location information. In addition, the system comprises an authorizing host that receives the signal transmitted by the remote terminal wherein the authorizing host evaluates the risk associated with the financial transaction based, at least in part, on the location information so as to determine whether to accept or decline the financial transaction, and wherein the authorizing host transmits a signal back to the remote terminal indicative of acceptance or decline of the proffered payment.

The aforementioned needs may also be satisfied by a method of determining the risk of accepting a proffered promissory payment. In one embodiment, the method comprises determining the location of a remote transaction device adapted to send transaction information about the proffered promissory payment to an authorizing host and sending the transaction information and the location information to the authorizing host. In addition, the method comprises performing a risk assessment of accepting the proffered promissory payment based upon the transaction information and the location information and sending a signal back to the remote transaction device indicative of whether the proffered promissory payment is to be accepted or declined.

The aforementioned needs may also be satisfied by a method of determining the risk of accepting a proffered payment. In one embodiment, the method comprises determining the location of a remote transaction device with a GPS signal, wherein the remote terminal is adapted to send transaction information about the proffered payment to an authorizing host and sending the transaction information and the location information to the authorizing host. In addition, the method comprises performing a risk assessment of accepting the proffered payment based upon the transaction information and the location information and sending a signal back to the remote transaction device indicative of whether the proffered payment is to be accepted or declined.

The aforementioned needs may also be satisfied by a system for determining the risk of accepting a proffered payment. In one embodiment, the system comprises a means for determining the location of at least one remote transaction device, wherein the at least one remote transaction device is adapted to send transaction information about the proffered payment to an authorizing host. In addition, the system comprises a means for sending the transaction information and the location information to the authorizing host and a means for performing a risk assessment of accepting the proffered payment based upon the transaction information and the location information. Moreover, the system comprises a means for sending a signal back to the at least one remote transaction device indicative of whether the proffered payment is to be accepted or declined.

These and other objects and advantages of the present teachings will become apparent from the following description taken in conjunction with the accompanying drawings.

DETAILED DESCRIPTION OF THE PREFERRED EMBODIMENT

Reference will now be made to the drawings wherein like numerals refer to like parts throughout. FIGS. 1-7 illustrate various aspects related to a system and method of risk assessment for financial transactions, whereby global positioning system (GPS) information is acquired for validation of financial transactions.

Figure 1:
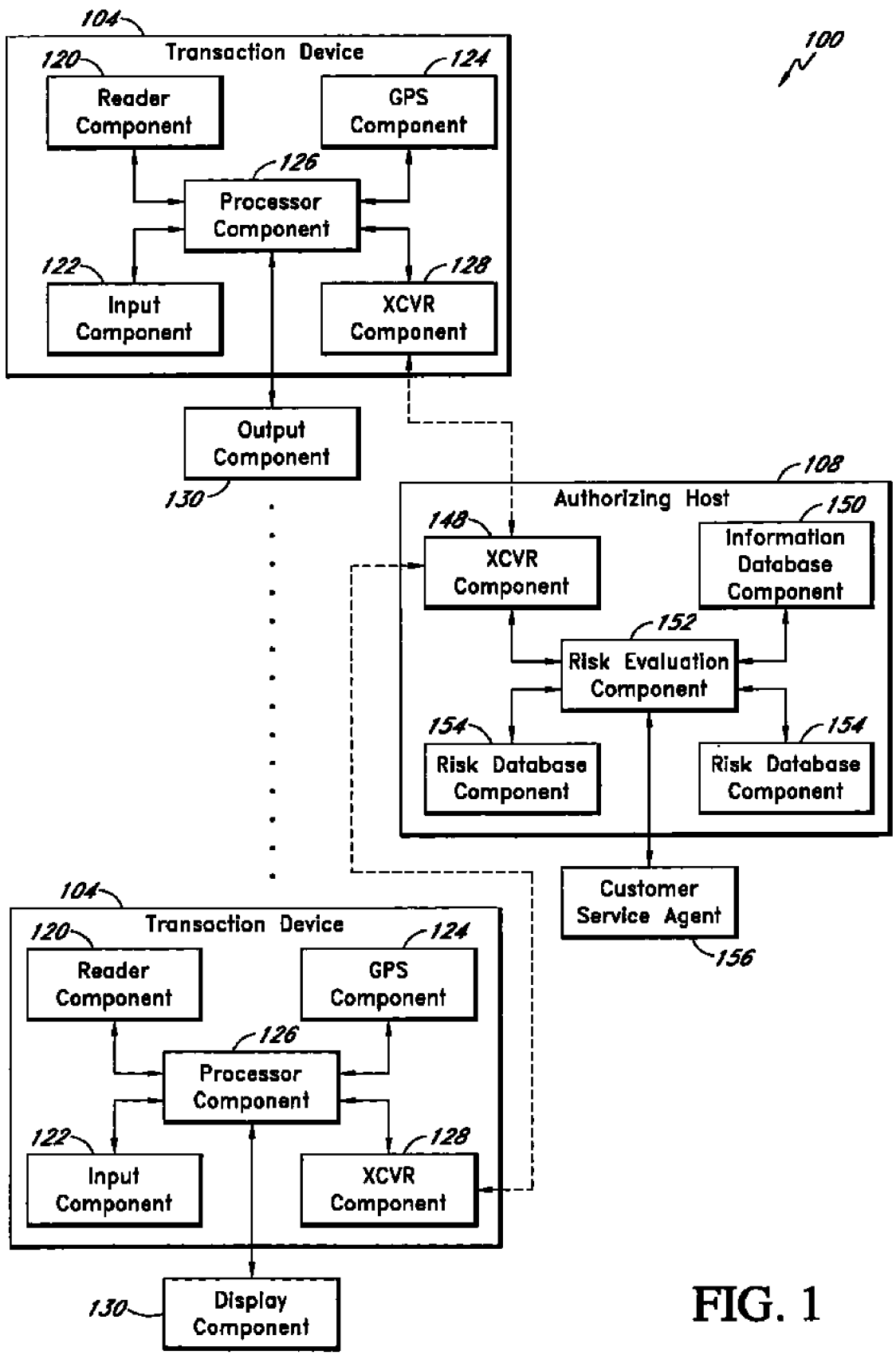
FIG. 1 illustrates one embodiment of a system for processing financial transactions.

FIG. 1 illustrates one embodiment of a system 100 for processing financial transactions. As illustrated in FIG. 1, the system 100 comprises one or more transaction devices 104, such as remote terminals or point of sale (POS) devices, and at least one authorizing host 108, such as a payment approval or risk assessment agency. The one or more transaction devices 104 and the authorizing host 108 communicate in a manner so as to process financial transactions and manage the risk or level thereof associated with each financial transaction.

In one embodiment, the transaction device 104 comprises a plurality of functional components including a reader component 120, an input component 122, a location component, such as a global positioning system (GPS) component 124, a processor component 126, a transceiver component 128, and an output component 130. Additionally, the transaction device 104 is utilized by a merchant to accept promissory payments from customers. In one aspect, the transaction device 104 comprises a remote terminal or POS device, such as an Eclipse™ device that is described in greater detail herein below and illustrated in FIG. 2. However, it should be appreciated by those skilled in the art that the transaction device 104 may also include various types of payment devices including a cash register, personal computer, etc. without departing from the scope of the present teachings. Therefore, it should also be appreciated by those skilled in the art that one or more of the components as described herein may be integrated into the various types of payment devices without departing from the scope of the present teachings.

The reader and input components 120, 122 may include a type of monetary exchange device, such as a check reader, credit card reader, debit card reader, keyboard for manual input of account information, or some combination thereof for the purpose of acquiring transaction information from customers at the point of sale. The reader and input components 120, 122 of the transaction device 104 identifies, by either magnetic ink character recognition (MICR) or optical character recognition (OCR), the American Banking Association (ABA) account information printed on the face of the check draft and converts the customer's ABA account information to transaction information, which may include digital signals or digital signatures. The transaction information may then be transferred from the transaction device 104 to the authorizing host 108 for processing. One example of a transaction device 104 is the Eclipse™ device currently available from Telecheck Inc. of Houston, Tex.

The location component 124 acquires positional information, such as coordinates, related to the location at which the financial transactions are occurring. In this implementation, the location component comprises a GPS component that receives signals from orbiting satellites in a known fashion to determine location and can thus provide a very specific location, accurate to within several yards, of the location of the transaction device 104. This location information can thus be provided to the authorizing host or risk assessment agency 108 and this information can be used during the risk assessment of accepting the proffered payment in the manner that will be described hereinbelow. While the current description refers to the transaction device 104 obtaining its location using the GPS system, it will be appreciated that any of a number of other location determining systems can be used without departing from the spirit of the present invention. For example, if the transaction device 104 is connected to the authorizing host 108 via telephone, location information can be determined by the telephone number the transaction device 104 is using to dial the authorizing host.

In general, a GPS receiver or GPS component communicates with a plurality of earth-orbiting GPS satellites via radio frequency (RF) signals. The GPS receiver gathers information related to the distance to each satellite and the distance between each satellite. The GPS gathers information by receiving and analyzing high-frequency, low-power radio signals from the GPS satellites. For example, the GPS receiver calculates the distance to GPS satellites by timing the radio signal from the satellite to the GPS receiver. The length of the delay is substantially equal to the travel time of the radio signal. The receiver multiplies this time by the speed of light to determine the distance that the signal traveled from the satellite to the GPS receiver. The GPS receiver then utilizes the GPS distance information to determine a location on earth. This operation is based on a generally known mathematical principle called trilateration.

According to one embodiment of the present teachings, various levels of risk for financial transactions can be associated to areas, locations, and regions where financial transactions take place. In general, some locations may be determined to be of lower or higher risk. For example, a high risk evaluation may be determined for a location that has a poor transaction history, such as a high crime area or an area with a large number of fraudulent transactions. In another example, a low risk area may have a good transaction history. In still another example, a moderate risk area may have a few returned checks, but the returned checks are paid with penalties. It should be appreciated that approved regions for financial transactions may be pre-defined or pre-determined prior to each financial transaction. In addition, various levels of risk for these approved regions may be stored in a database and accessed for each financial transaction. Moreover, various levels of risk can also be associated to ZIP coded regions, wherein the GPS coordinates can be compared to approved ZIP code regions. Further scope and functionality related to these concepts will be described in greater detail hereinbelow.

The transceiver component 128 of the transaction device 104 is adapted to transmit data and information including a transaction data package from the transaction device 104 to the authorizing host 108. The transceiver component 128 is also adapted to receive data and information including approval and/or decline data from the authorizing host 108. The output component 130 may include a display monitor, a printer, or various other output peripherals generally known in the art. The display monitor may comprise a video monitor, a liquid crystal display (LCD), or any other relevant type of display.

The processor component 126 of the transaction device 104 coordinates the functions of the transaction device 104. The processor component 126 communicates with the reader and input components 120, 122 so as to receive transaction information therefrom. The processor component 126 communicates with the location component 124 so as to receive the location information therefrom. The processor component 126 combines or packages the transaction information and the location information into a recognizable transaction data package. The processor component 126 communicates with the transceiver component 128 so as to coordinate the transmission of the transaction data package to the authorizing host 108 and also to receive validation information from the authorizing host 108. The processor component 126 communicates with the display component to inform the user of the current status of financial transactions.

In one embodiment, the authorizing host 108 comprises a plurality of functional components including a transceiver component 148, a information database component 150, a risk evaluation component 152, and one or more risk database components 154. These components may either be part of a single integrated system or may be comprised of a distributed system. The authorizing host 108 is adapted to determine and evaluate the risk for financial transactions based, at least in part, on the GPS information received from the transaction device 104. For example, the risk evaluation component 152 evaluates information, such as the check amount, the ID of the check writer, the merchant, the type of merchandize being purchased as well as the location information provided by the transaction device 104 to determine a risk score of accepting the check or other proffered payment. The risk score is, of course, indicative of whether the proffered payment will be backed by suitable funds in the individual's account when the merchant submits the check, either electronically or physically, to the individual's bank. One example of an authorizing host is the risk assessment agency run by Telecheck, Inc. of Houston, Tex.

The authorizing host 108 interacts with the one or more transaction devices 104 via the transceiver components 128, 148, such as a telephonic, satellite, and/or computer network (internet) interface and performs this risk analysis for a plurality of merchants on a plurality of different transactions. The authorizing host 108 further returns an approval or decline decision to the transaction device 104 via the transceiver components 128, 148 and displays the applicable results on the display component of the transaction device 104.

In one embodiment, the transceiver component 148 of the authorizing host 108 receives data and information including the transaction data package from each transceiver component 128 of each transaction device 104. The transceiver component 148 may also be adapted to transmit data and information including approval and/or decline data from the authorizing host 108 to the transaction device 104. It should be appreciated that the transceiver component 148 for the authorizing host 108 may have similar scope and functionality as the transceiver component 128 for the transaction device 104. In general, the transceiver components 128, 148 are adapted to communicate so as to transfer transaction information for each financial transaction between the authorizing host 108 and the transaction device 104.

In one embodiment, the information database component 150 of the authorizing host 108 comprises a plurality of merchant parameters that identify approved locations for financial transactions that correspond to the location information, such as coordinates. When financial transactions are submitted by the transaction device 104, the authorizing host 108 retrieves information related to the current merchant from the information database component 150 and determines if the current merchant is authorized to process financial transactions in the submitted locations. If the submitted location information is acceptable, then the merchant is authorized to continue processing the financial transaction. If the location information is not acceptable, then the authorizing host 108 may either decline the financial transaction or request additional information from the merchant so as to determine if the level of risk for the financial transaction is within a range of acceptance. Further scope and functionality related to risk analysis by the authorizing host 108 will be described in greater detail hereinbelow.

In another embodiment, the information database component 150 comprises location information which is defined as GPS coordinates and corresponding zip code information that can be used by the risk evaluation component 152 to correlate GPS coordinates to the corresponding zip code information. In general, GPS coordinates can define areas, locations, and positions within boundaries of known zip code regions. A risk value or level of risk for financial transactions in certain zip code regions can be pre-determined and stored in the information database component 150. Thus, when GPS information is received for financial transactions, the location of a particular financial transaction can be matched to a corresponding zip code region so as to determine a risk value or level of risk.

In addition to the location information, the risk evaluation component 152 may also access and retrieve relevant transaction information about customers, such as check writing history, and the merchants, such as a pre-determined limit on an acceptable check draft amount or credit requisition and other specific factors preferences, from one or more risk database components 154. The risk databases allow the risk evaluation component 152 to gather relevant transaction information about customers and merchants that may not necessarily be available in the information database component 150 so as to further facilitate the risk assessment. The risk evaluation component 152 utilizes the relevant information to evaluate financial transactions so as to adapt the manner in which the risk assessment is performed by the authorizing host 108.

The risk evaluation component 152 may further function as a risk scoring engine that evaluates financial transactions in a known manner based on the received transaction information including the location information and the risk information from the risk database components 154. The risk scoring engine function may determine a risk score indicative of a probable risk assessment of each financial transaction. Advantageously, the risk scoring engine function may comprise a plurality of risk scoring engines, wherein each risk scoring engine is adapted to address a plurality of possible financial transactions or transaction variables in a manner so as to improve accuracy in determining the risk score.

For example, the risk evaluation component 152 may access the information database component 150 for transaction information about the location of the financial transaction and ascertains whether the financial transaction is occurring in a high risk region. In this example, high risk financial transactions arise from unfavorable financial transaction histories in particular locations. As a result, the risk evaluation component 152 may then decide that the financial transaction is of high risk and, in which case, subsequently declines authorization due to an unacceptable risk score ascertained for the financial transaction.

Figure 2:
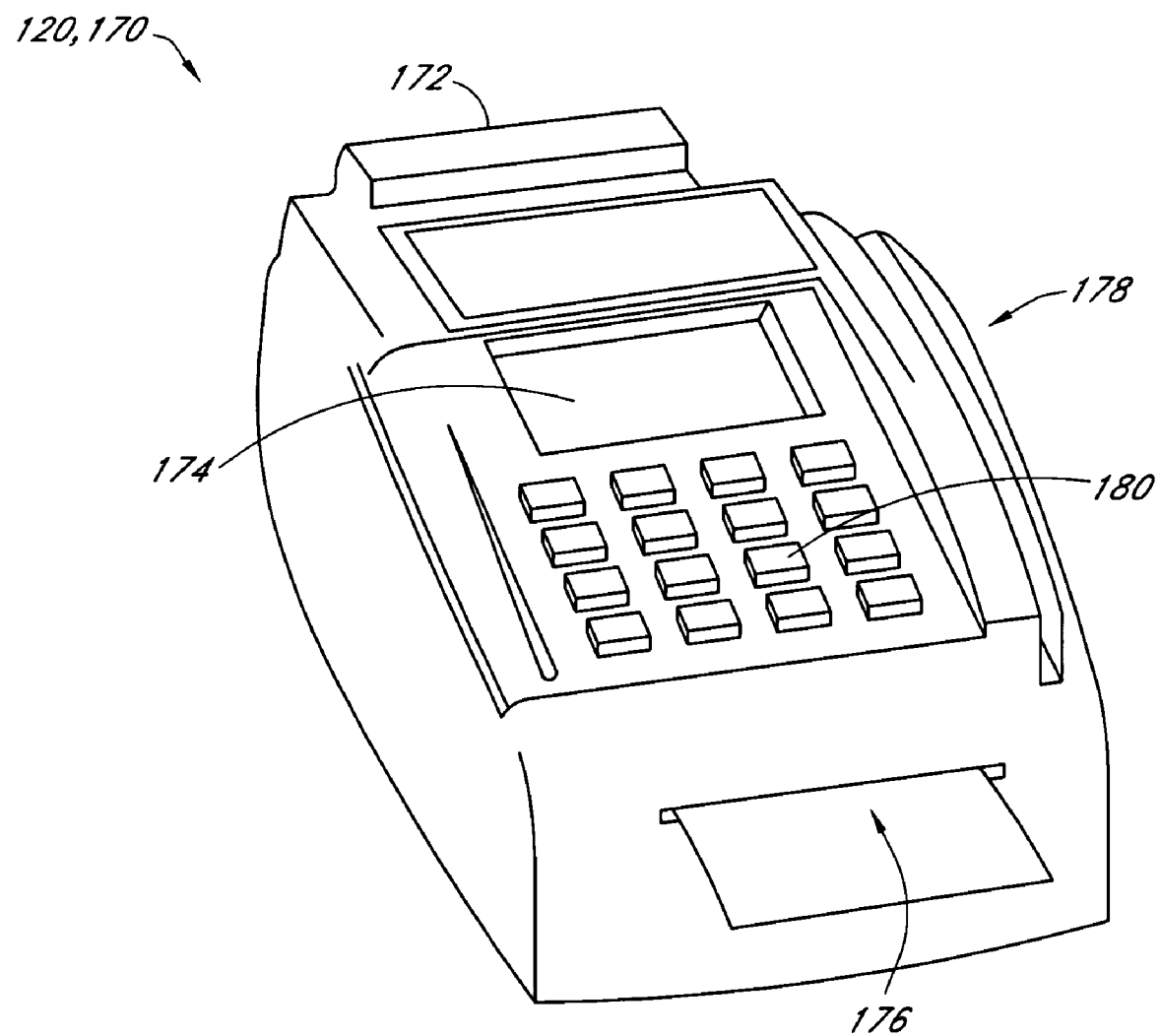
FIG. 2 illustrates one embodiment of the transaction device.

FIG. 2 illustrates one embodiment of the transaction device 104. As illustrated in FIG. 2, the transaction device 104 may comprise an Eclipse™ terminal 170 manufactured by Telecheck, Inc. of Houston, Tex. Advantageously, in one aspect of the present teachings, the Eclipse™ terminal 170 can be adapted so as to integrate the location component 124, such as a GPS receiver, therein so that GPS information can be gathered and sent to the authorizing host 108 for each financial transaction. It should be appreciated by those skilled in the art that the remote terminal or POS device may also include various forms of payment devices including a cash register, personal computer, etc. without departing from the scope of the present teachings. Therefore, it should also be appreciated by those skilled in the art that the GPS component as described herein may be integrated into various types of payment devices without departing from the scope of the present teachings.

In one embodiment, the Eclipse™ terminal 170 comprises a POS payment terminal that is adapted to accept various non-cash payment types including checks, credit cards, debit cards, and electronic benefit transfer (EBT) transactions. In addition, the Eclipse™ terminal 170 also enables the TeleCheck Electronic Check Acceptance® (ECA®) service and many other TeleCheck services. Advantageously, TeleCheck and the Eclipse™ terminal combine the benefits of accurate databases with advanced authorization and payment technology.

In one embodiment, the Eclipse™ terminal 170 comprises a built-in ink jet receipt printer 172 that reduces counter space, voids ECA transactions, and endorses paper checks to include subscriber number and approval code. Additionally, the Eclipse™ terminal 170 comprises a backlit touch-screen display 174 that provides a user friendly interface and exceptional visibility.

Moreover, the Eclipse™ terminal 170 rapidly authorizes financial transactions so as to speed up checkout. In one embodiment, the Eclipse™ terminal 170 comprises a check reader 176 that enables the conversion of paper checks to electronic items. In addition, the Eclipse™ terminal 170 comprises a dual-track magnetic strip reader 178 that automatically collects and inputs data from credit cards and driver's licenses.

Furthermore, the Eclipse™ terminal 170 comprises a full reporting capability that provides easy access to transaction and payment information including sales amounts and various other details for each payment type. In one embodiment, the Eclipse™ terminal 170 stores up to 500 check and 300 card transactions. In addition, the Eclipse™ terminal 170 comprises check imaging capability that allows merchants to process most checks without identification. Also, the Eclipse™ terminal 170 comprises a user friendly keyboard 180, such as a numeric or alphanumeric keyboard. It should be appreciated by those skilled in the art that the transaction device 104 may comprise various other generally known POS devices without departing from the scope of the present teachings.

Figure 3:
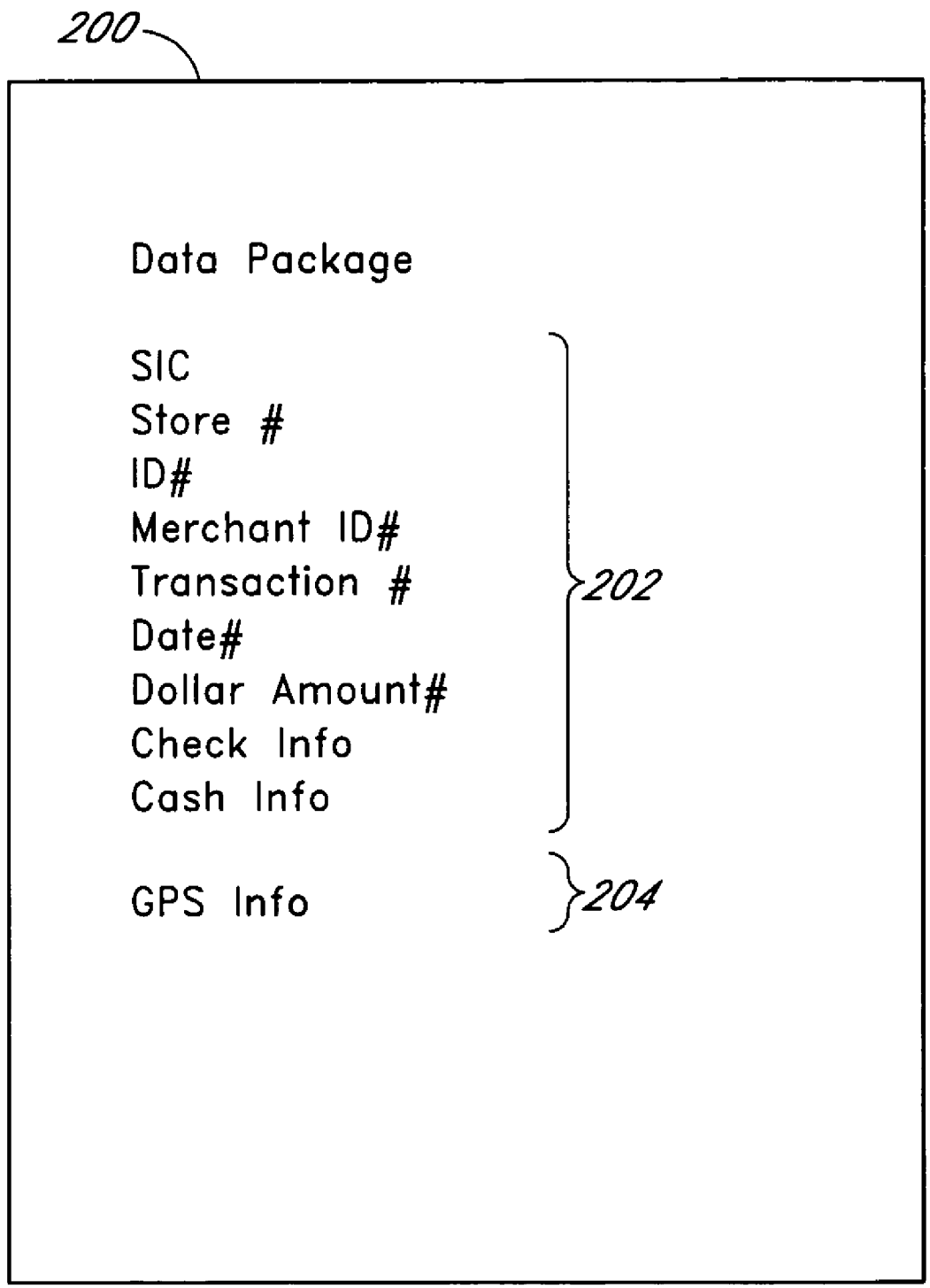
FIG. 3 illustrates one embodiment of a transaction data package.

FIG. 3 illustrates one example of a transaction data package 200 that is transmitted from the transaction device 104 to the authorizing host 108. The transaction data package 200 of FIG. 3 is simply exemplary of the information that is provided to the authorizing host 108 when a financial transaction is being sent to the authorizing host 108 for risk assessment and the format of the packet can be any of a number of different formats known in the art. As illustrated in FIG. 3, the transaction data package 200 comprises transaction information 202 and location information 204, such as GPS information. In one aspect, the transaction information 202 may include one or more data components including store information, merchant information, clerk identification number, customer information, transaction number, transaction date, transaction dollar amount, and payment information, such as credit, check, and/or cash information. In addition, the transaction information 202 may further include a subscriber information code (SIC) that identifies the merchant and/or transaction device 104. Advantageously, the authorizing host 108 can utilize the SIC component of the transaction information 202 to retrieve merchant parameters from the information database 150 for subsequent risk assessment of the financial transaction by the risk evaluation component 152. Moreover, the location information 204 includes transaction location information, such as GPS positional coordinates of each financial transaction. Advantageously, the risk evaluation component 152 can utilize the retrieved merchant parameters together with the received GPS information 204 to determine the risk or level thereof for each financial transaction.

Hence, the transaction device 104 transmits a data package that identifies the merchant, the customer, the amount of the proffered payment and the location of the transaction device when the proffered payment is made. This information allows the authorizing host 108, e.g., the risk assessment component, to receive sufficient information to assess the risk of accepting the proffered payment.

Figure 4:
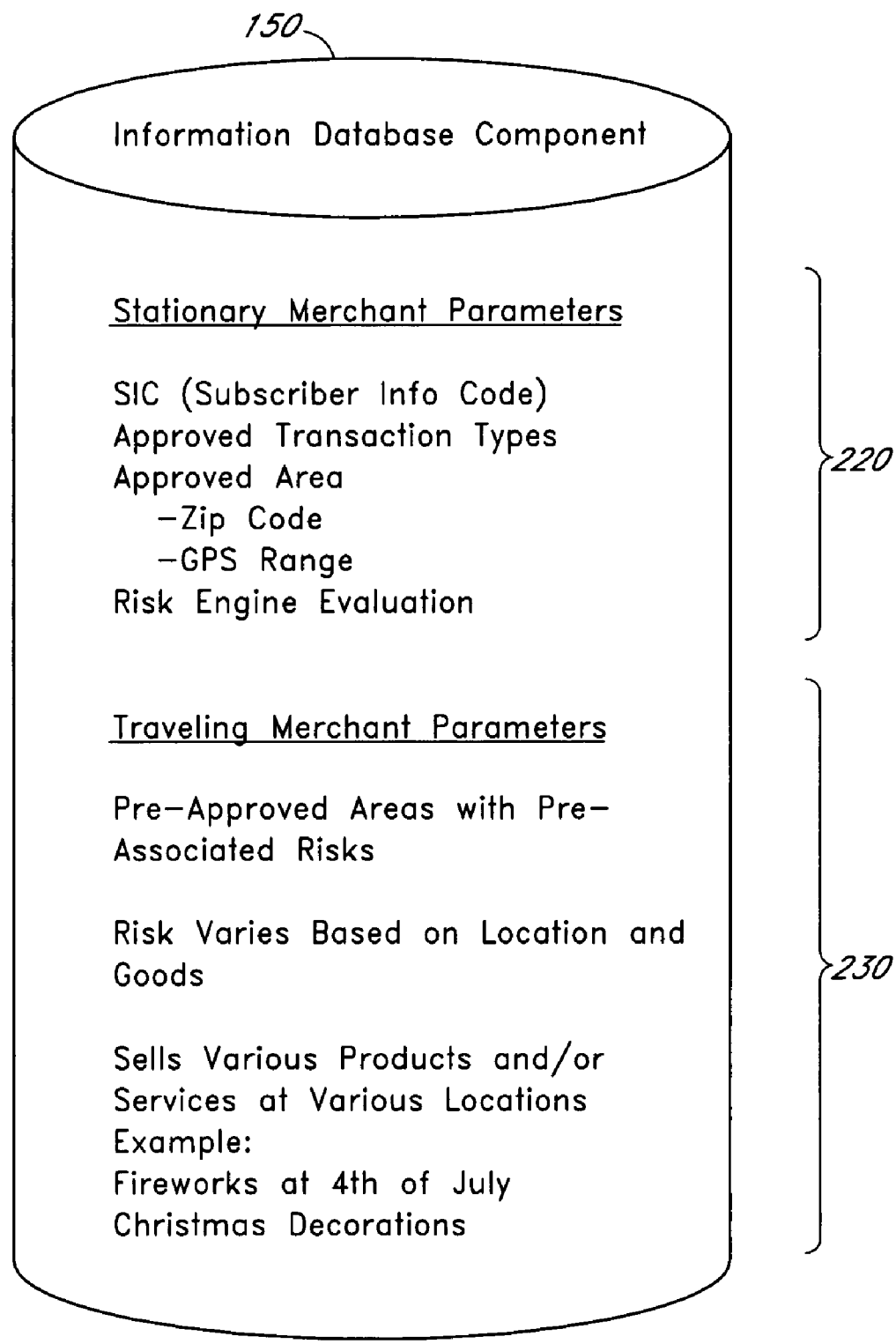
FIG. 4 illustrates one embodiment of the information database component.

FIG. 4 illustrates one embodiment of the information database component 150. As illustrated in FIG. 4, the information database component 150 comprises stored information and/or data related to the subscriber information code (SIC), approved transaction types, approved transaction areas, and risk engine evaluation items. The SIC component identifies the merchant and at least one transaction device 104 usable by the merchant for financial transactions in approved locations. The approved transaction types may include cash, check, debit, credit, and EBT transactions. Also, the approved transaction types may be restricted for a particular merchant and/ or transaction location. Alternatively, the risk scoring protocols for different types of transactions can be different for different merchants. For example, accepting a particular type of proffered payment by one merchant in one location may require a different risk assessment than accepting other types of payments. Hence, the transaction types may also provide indications of risk protocols for each transaction type for different merchants.

In one embodiment, the information database component 150 may be configured with stationary merchant parameters 220 such that financial transactions are restricted to proximate locations within a specified area, such as a commercial building. In general, a stationary merchant may be defined as a merchant that does business from a single location, such as a grocery store, hardware store, auto repair, etc. Alternately, in another embodiment, the information database component 150 may be configured with traveling merchant parameters 230 such that financial transactions are defined for a plurality of distal locations approved by the authorizing host 108.

For example, the present teachings may be useful for various embodiments of stationary merchants, stationary merchants that change physical location and/or the nature of the business, traveling merchants, and traveling merchants that change physical location and/or the nature of the business. In one aspect, managing risk for traveling merchants includes seasonal merchants and merchants that travel while conducting business. It should be appreciated by those skilled in the art that a change in location of the remote terminal or POS device may signify that the risk of financial transactions have changed, but alternately for the permanent or stationary merchants or vendors, such as hardware stores, pawn shops, etc., a change in location may signify that the nature of the business, such as goods and service provided, have changed. Thus, a change in location for stationary and/or traveling merchants may require that the authorizing host, such as TeleCheck, may proceed to stop processing financial transactions for the merchant until the change of location has been approved, researched, and/or verified, which may include validating new addresses and/or approving a new contract for the merchants.

Additionally, it should be appreciated that the information database component 150 configured for traveling merchants may comprise the scope and functionality of the stationary merchant configured information database component 150 with the added benefit of portability between a plurality of distal locations. In one aspect, the plurality of distal locations may be pre-approved by the authorizing host 108 for the traveling merchant. In other words, the known locations at which the merchant will sell their products may be previously provided to the authorization host 108. Hence, when the transaction device 104 provides signals indicating that the merchant has traveled from one location to another, the authorizing host can update their risk scoring protocols to reflect the new location. The travel can, of course, be between cities or states or even countries.

Additionally, the information database component 150 can also store approved areas and/or locations for particular merchants. For a stationary merchant, such as an owner of a commercial building or store, the approved area is the localized proximity of the store, which can be identifiable with a designated GPS coordinate or proximate range of GPS coordinates. For example, if the transaction device 104 was moved out of an approved proximity to the commercial building, then financial transactions may be assessed with updated risk protocols or may even be declined. Therefore, the transaction device 104 can be substantially restricted to process financial transactions in the approved proximity depending on the needs of the merchant. Advantageously, fraud can be reduced due to the requirement of location information, e.g., GPS coordinate matching, of the financial transactions between the transaction device 104 and the authorizing host 108.

In another example, the default or approved transaction area for the merchant may be defined by a particular zip code. If the location information provided by the transaction device 104 does not fall within the correct zip code, then either the transaction can be denied or the risk protocols can be updated to accommodate the new location. To facilitate, this implementation, the authorizing host 108 may include a zip code map where GPS coordinates are mapped by zip codes.

Figure 5:
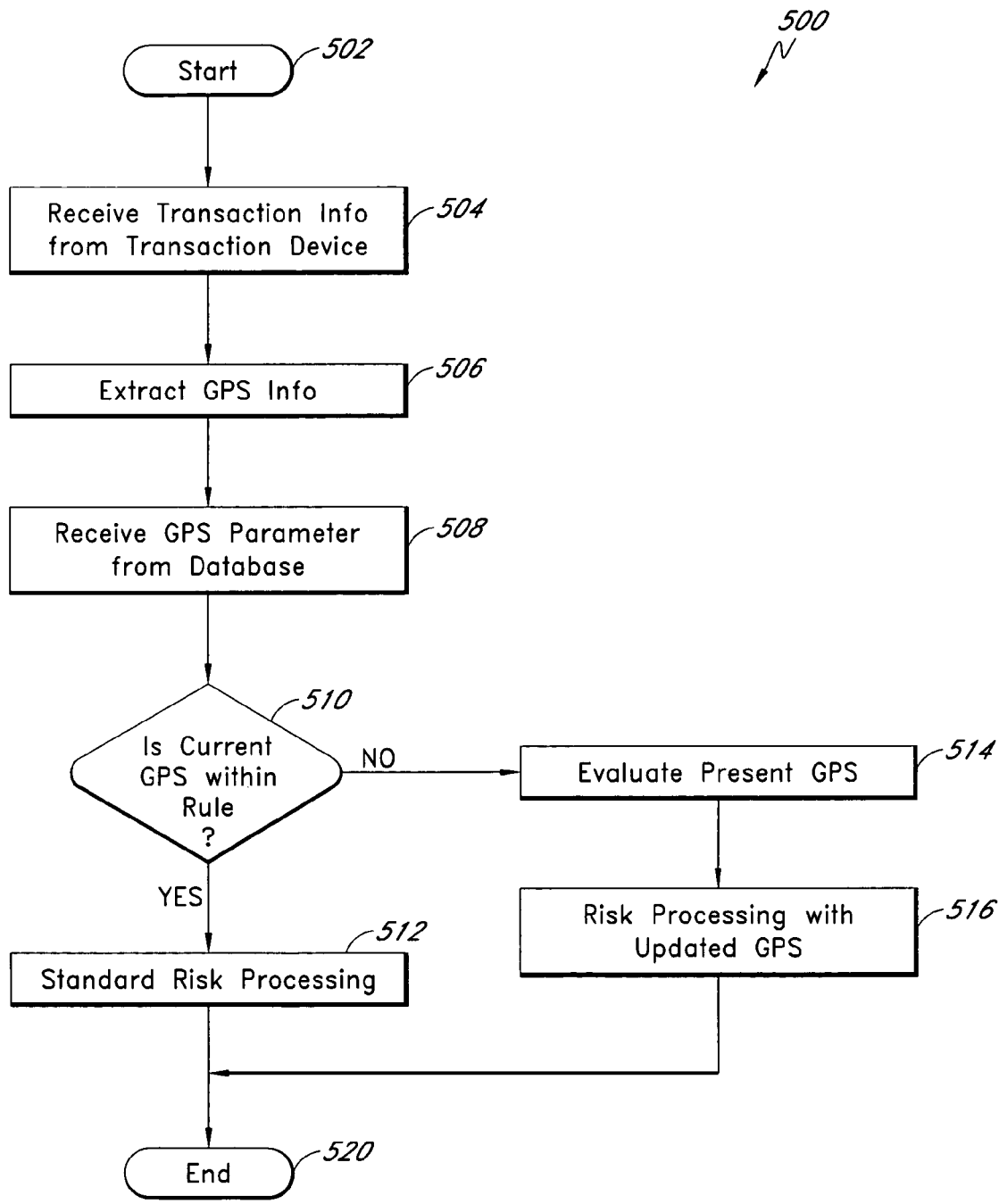
FIG. 5 illustrates one embodiment of a risk analysis process.

FIG. 5 illustrates one exemplary embodiment of a risk analysis process 500 performed by the risk evaluation component 152 of the authorizing host 108. As illustrated in FIG. 5, the process 500 initiates in a start state 502 and proceeds to state 504, wherein the authorizing host 108 receives the data package 200 from the transaction device 104. As discussed above, the data package 200 includes identifying information about the transaction such as the customer, the type of proffered payment, the purchase amount, etc. and identifying information about the merchant such as the SIC code for the merchant, as well as the location information, e.g., the GPS coordinates, of the transaction device 104.

Next, in state 506, the risk evaluation component 152 extracts the transaction information and the location information, e.g., the GPS coordinates, from the data package and identifies the location of the financial transaction from the location information. The risk evaluation component 152 then identifies, in state 508, the merchant from the transaction information and retrieves a location parameter, such as approved locations, from the information database component 150.

In state 510, the risk evaluation component 152 determines whether the location of the financial transaction is an approved location based on the retrieved GPS parameter. If the transaction location is a location that has been previously approved for the merchant, then the risk evaluation component 152 proceeds with standard risk processing in state 512.

Otherwise, if the location is not within the boundaries specified by the retrieved location parameter, then the risk evaluation component 152 evaluates the present GPS coordinates in state 514 to update the risk scoring model. As discussed above, the risk of accepting proffered payments may vary depending upon the geographical location of the transaction. The risk evaluation component 152 can have access to data that can be used to update a risk scoring model with the new location. In some circumstances, the location may be such that the risk will be so high for a particular transaction that the proffered payment may be declined.

Once the risk parameters have been updated to accommodate the new location, the risk evaluation component 152 can perform risk processing, in state 516, with the updated parameters and the current GPS coordinates. The process terminates in an end state 520.

In this way, the change in location of the transaction device 104 can be immediately provided to the authorizing host 108 and the authorizing host 108 can update its risk assessment of accepting a proffered payment based on the new location. The transmission of GPS coordinates provides a simple method of providing location information that can be compared to either pre-approved locations for this particular merchant or can be used to update risk assessment parameters based upon known risk factors for the new location.

Figure 6A:
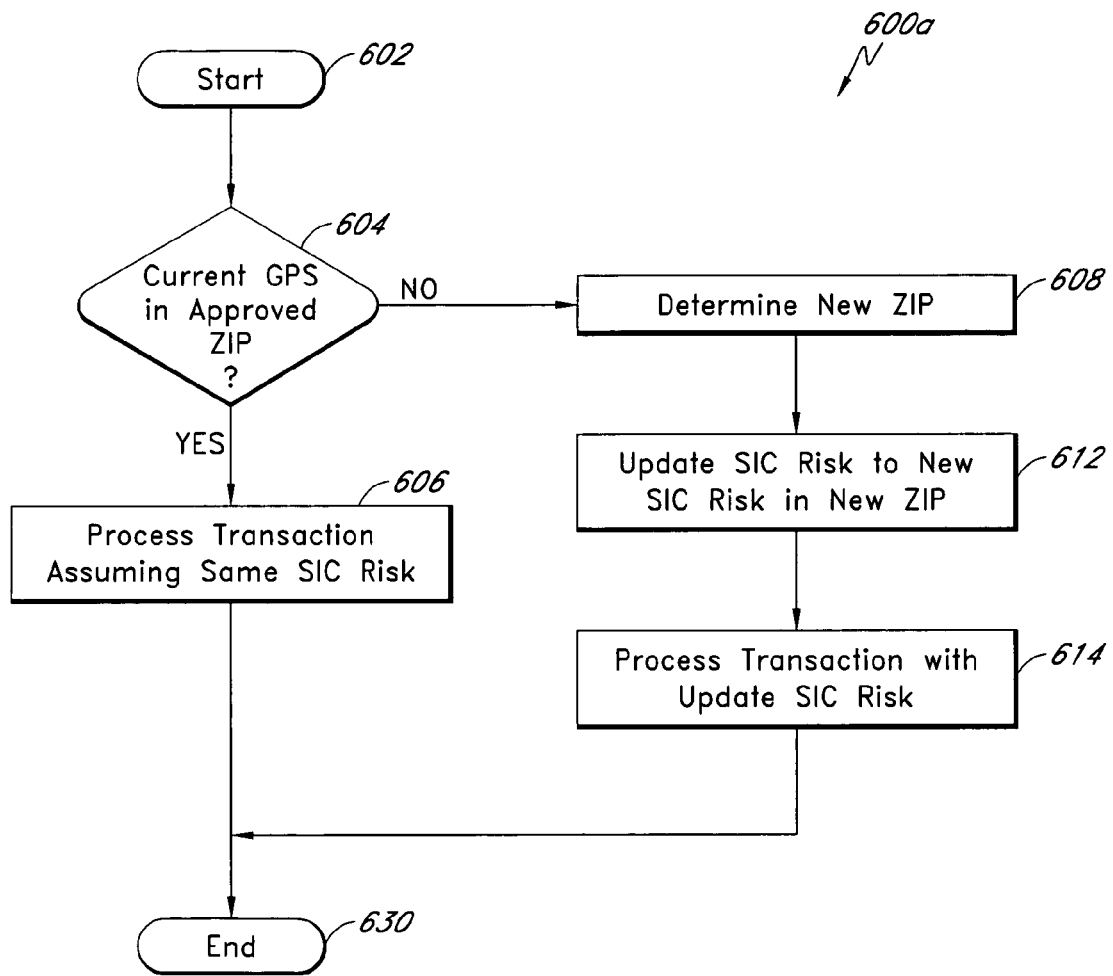
FIG. 6A illustrates another embodiment of a risk analysis process.

FIG. 6A illustrates another embodiment of a risk analysis process 600a performed by the risk evaluation component 152 of the authorizing host 108. As illustrated in FIG. 6A, the process 600a initiates in a start state 602 and proceeds to a decision state 604, wherein the authorizing host 108 evaluates the GPS information extracted from the data package. In addition, the risk evaluation component 152 determines whether the GPS information is associated with an approved ZIP code value or within an approved ZIP code range for the merchant. In general, the GPS information can be associated to one or more ZIP code regions for purposes of risk assessment by the risk evaluation component 152.

Next, if the GPS information is approved, then the process 600a advances to state 606, wherein the financial transaction is processed assuming the same SIC risk as retrieved from the information database component 150. Otherwise, in state 608, if the GPS information is not approved, then the risk evaluation component 152 determines a new ZIP code, in state 612, from the GPS information and calculates a new SIC risk based, at least in part, on the new ZIP code. Following, in state 614, the risk evaluation component 152 processes the financial transaction with the updated SIC risk. The process terminates in an end state 630.

Figure 6B:
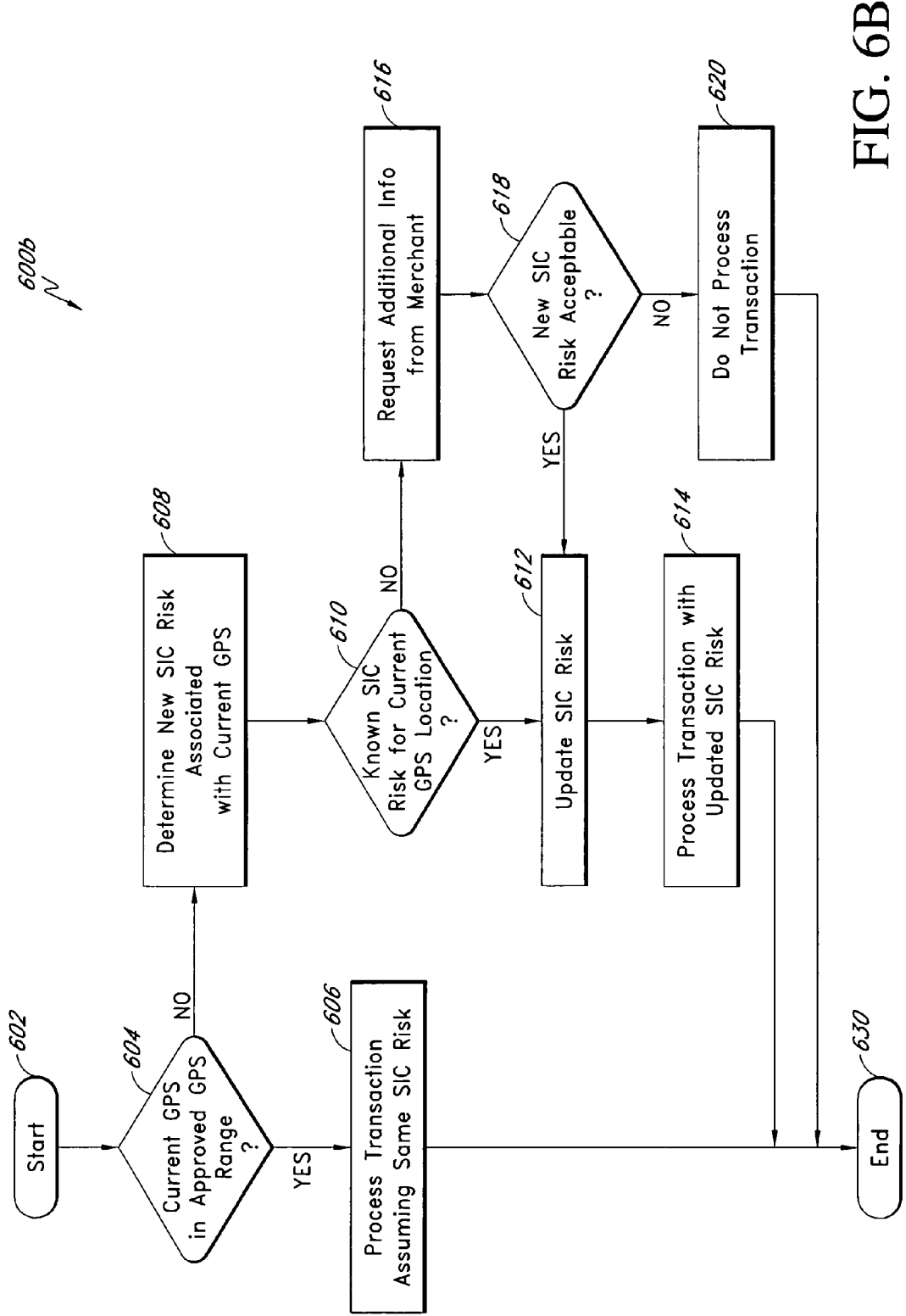
FIG. 6B illustrates still another embodiment of a risk analysis process.

FIG. 6B illustrates still another embodiment of a risk analysis process 600b performed by the risk evaluation component 152 of the authorizing host 108. It should be appreciated that FIG. 6B is related to process 600a of FIG. 6A with the added states 610, 616, 618, 620. As illustrated in FIG. 6B, following state 608, the process 600b advances to a decision state 610, wherein the risk evaluation component 152 determines if a known SIC risk is available for the current GPS location of the financial transaction.

In one aspect, the risk evaluation component 152 attempts to retrieve merchant parameters from the information database component 150 related to known SIC risk information for the current merchant. If there is a known SIC risk for the current GPS location, then the process 600b advances to state 612, and the process 600b proceeds as previously described in FIG. 6A. Otherwise, if the SIC risk for the current GPS location is unavailable, then the process 600b advances to state 616, wherein the risk evaluation component 152 requests additional information from the merchant.

For example, the risk evaluation component 152 may verify merchant identification, location, and various other transaction information. Next, in a decision state 618, if the risk evaluation component 152 determines that the new or verified SIC risk information is acceptable, then the process advances to state 612, and the process 600b proceeds as previously described in FIG. 6A. However, if the new or verified SIC risk information is not acceptable, then the process advances to state 620, wherein the risk evaluation component 152 informs the merchant not to proceed with processing the financial transaction. In other words, the authorizing host 108 declines the financial transaction and informs the merchant via the transaction device 104. The process 600b terminates in state 630.

Advantageously, GPS information and/or coordinates can be used by the authorizing host 108 to mitigate the risk or level thereof associated with the use of wireless transaction devices. In one aspect, the authorizing host 108 can receive GPS coordinates from one or more transaction devices 104 having a range of valid GPS coordinates for each merchant controlled transaction device 104. Sometimes, if the received GPS coordinates from each transaction device 104 fail to match the stored merchant parameters of approved GPS coordinates or fall within a range of approved GPS coordinates for the merchant, then the financial transaction can be treated differently. Beneficially, this allows a merchant to process financial transactions in a plurality of approved locations with the same transaction device 104. As a result, each transaction device 104 may be adapted to comprise a greater approval region depending on the requirements or needs of the merchant.

Moreover, the authorizing host 108 can utilize the SIC component of the transaction information 202 to retrieve merchant parameters for subsequent risk assessment of the financial transaction. Advantageously, the authorizing host 108 can further utilize the retrieved merchant parameters together with the received GPS information 204 to determine the risk or level thereof for each financial transaction. As a result, fraud can be reduced due to the requirement of GPS coordinate matching of the financial transactions between the transaction device 104 and the authorizing host 108.

Although the following description exemplifies one embodiment of the present teachings, it should be understood that various omissions, substitutions, and changes in the form of the detail of the apparatus, system, and/or method as illustrated as well as the uses thereof, may be made by those skilled in the art, without departing from the spirit of the present teachings. Consequently, the scope of the present teachings should not be limited to the disclosed embodiments, but should be defined by the appended claims.

What is claimed is:

1. A system for processing financial transactions comprising:
   at least one remote terminal assigned to a traveling merchant, wherein a change in location associated with the traveling merchant effects a change in location of the at least one remote terminal, wherein the at least one remote terminal identifies a distal GPS (Global Positioning System) location of a financial transaction, wherein the at least one remote terminal also acquires transaction information about a proffered promissory payment and transmits a signal indicative of the transaction information and the distal GPS location information; and
   an authorizing host that receives the signal transmitted by the at least one remote terminal wherein the authorizing host evaluates the risk associated with the financial transaction based, at least in part, on comparing the distal GPS location information to a plurality of pre-approved locations the traveling merchant travels to in order to conduct transactions, wherein the authorizing host adjusts the risk evaluation based upon the distal GPS location information, so as to determine whether to accept or decline the financial transaction, wherein the authorizing host transmits a signal back to the at least one remote terminal indicative of acceptance or decline of the proffered promissory payment, and when the at least one remote terminal declines the financial transaction, the authorizing host is configured to evaluate additional merchant parameters associated with the financial transaction that are different than the distal GPS location information.

2. The system of claim 1, wherein the at least one remote terminal includes a Global Positioning System (GPS) receiver that receives GPS signals and determines the location coordinates of the at least one remote terminal based upon the GPS signal.

3. The system of claim 2, wherein the authorizing host includes a risk assessment component that evaluates the risk associated with the financial transaction, wherein the risk assessment component adjusts the risk assessment based upon the location information received from the at least one remote terminal.

4. The system of claim 3, wherein the risk assessment component categorizes an approved location for the at least one remote terminal, wherein the risk assessment component performs a standard risk assessment when the location information indicates that the at least one remote terminal is at the approved location.

5. The system of claim 4, wherein the risk assessment component adjusts the risk assessment when the location information indicates that the at least one remote terminal is not in the approved location by evaluating risk factors associated with the new location.

6. The system of claim 5, wherein the risk factors for the new location include payment history on other proffered promissory payments in the same location.

7. The system of claim 3, wherein the authorization host categorizes a plurality of approved locations for the at least one remote terminal wherein the merchant can move the at least one remote terminal from one location to another.

8. The system of claim 7, wherein the risk assessment component declines transactions when the location information provided by the at least one remote terminal indicates the at least one remote terminal is not in one of the plurality of approved locations.

9. The system of claim 7, wherein the plurality of approved locations are defined as a region in which the GPS coordinates provided by the at least one remote terminal must fall within.

10. The system of claim 9, wherein the authorization host has a data structure associated therewith that maps zip codes to GPS coordinates wherein the authorization host can determine if a GPS coordinate falls within a particular zip code wherein the approved location for the at least one remote terminal is defined in terms of approved zip codes.

11. The system of claim 1, wherein the at least one remote terminal comprises a plurality of remote terminals.

12. The system of claim 1, wherein the signal comprises a data package having transaction information selected from the group consisting of store number, identification number, clerk number, transaction number, date, dollar amount, check information, cash information, and GPS information.

13. A system for processing financial transactions comprising:
  at least one remote terminal assigned to a traveling merchant, wherein a change in location associated with the traveling merchant effects a change in location of the at least one remote terminal, wherein the at least one remote terminal identifies a distal GPS (Global Positioning System) location of a financial transaction with a GPS signal, wherein the at least one remote terminal also acquires transaction information about a proffered payment and transmits a signal indicative of the transaction information and the distal GPS location information; and
  an authorizing host that receives the signal transmitted by the at least one remote terminal wherein the authorizing host evaluates the risk associated with the financial transaction based, at least in part, on comparing the distal GPS location information to a plurality of locations the traveling merchant travels to in order to conduct transactions, wherein the authorizing host adjusts the risk evaluation based upon the distal GPS location information, so as to determine whether to accept or decline the financial transaction, wherein the authorizing host transmits a signal back to the remote terminal indicative of acceptance or decline of the proffered payment, and when the at least one remote terminal declines the financial transaction, the authorizing host is configured to evaluate non-location based risk factors associated with the financial transaction.

14. The system of claim 13, wherein the proffered payment includes a proffered promissory payment.

15. The system of claim 14, wherein the proffered promissory payment includes a payment by check.

16. The system of claim 13, wherein the at least one remote terminal includes a GPS receiver that receives the GPS signal and determines the location coordinates of the at least one remote terminal based upon the GPS signal.

17. The system of claim 16, wherein the authorizing host includes a risk assessment component that evaluates the risk associated with the financial transaction, wherein the risk assessment component adjusts the risk assessment based upon the location information received from the at least one remote terminal.

18. The system of claim 17, wherein the risk assessment component categorizes an approved location for the at least one remote terminal, wherein the risk assessment component performs a standard risk assessment when the location information indicates that the at least one remote terminal is at the approved location.

19. The system of claim 18, wherein the risk assessment component adjusts the risk assessment when the location information indicates that the at least one remote terminal is not in the approved location by evaluating risk factors associated with the new location.

20. The system of claim 19, wherein the risk factors for the new location include payment history on other proffered payments in the same location.

21. The system of claim 17, wherein the authorization host categorizes a plurality of approved locations for the at least one remote terminal wherein the merchant can move the at least one remote terminal from one location to another.

22. The system of claim 21, wherein the risk assessment component declines transactions when the location information provided by the at least one remote terminal indicates that the at least one remote terminal is not in one of the plurality of approved locations.

23. The system of claim 22, wherein the plurality of approved locations are defined as a region in which the GPS coordinates provided by the at least one remote terminal must fall within.

24. The system of claim 23, wherein the authorization host has a data structure associated therewith that maps zip codes to GPS coordinates wherein the authorization host can determine if a GPS coordinate falls within a particular zip code wherein the approved location for the at least one remote terminal is defined in terms of approved zip codes.

25. The system of claim 13, wherein the at least one remote terminal comprises a plurality of remote terminals.

26. The system of claim 13, wherein the signal comprises a data package having transaction information selected from the group consisting of store number, identification number, clerk number, transaction number, date, dollar amount, check information, cash information, and GPS information.

27. A method of determining the risk of accepting a proffered promissory payment, the method comprising:
  assigning a remote transaction device to a traveling merchant, wherein a change in location associated with the traveling merchant effects a change in location of the remote transaction device;
  determining a distal GPS (Global Positioning System) location of the remote transaction device to send transaction information about the proffered promissory payment to an authorizing host;
  sending the transaction information and the distal location information to the authorizing host;
  performing a risk assessment of accepting the proffered promissory payment based upon the transaction information and the distal GPS location information, wherein the risk assessment is adjusted when the location of the remote transaction device is not within at least one of a plurality of authorized locations the traveling merchant travels to in order to conduct transactions; and sending a signal back to the remote transaction device indicative of whether the proffered promissory payment is to be accepted or declined.

28. The method of claim 27, wherein determining the location of the remote transaction device comprises receiving GPS signals and determining a GPS based location of the remote transaction device.

29. The method of claim 27, wherein performing a risk assessment of accepting the proffered promissory payment comprises determining whether the GPS based location is in at least one pre-approved location for the remote transaction device.

30. The method of claim 29, wherein determining whether the GPS based location is in the at least one pre-approved location comprises determining whether the GPS based location is within a region defined by a pre-approved zip code for the remote transaction device.

31. The method of claim 29, wherein performing the risk assessment further comprises determining a risk score of accepting the proffered promissory payment based upon the GPS information, the information about the merchant, the amount of the proffered promissory payment, and the type of transaction to determine the risk score.

32. The method of claim 31, wherein the risk score is adjusted based upon whether the GPS information is within a pre-approved location for the remote transaction device.

33. The method of claim 29, wherein performing the risk assessment of accepting the proffered promissory payment comprises determining whether the GPS based location is in the at least one pre-approved location and comprises determining which of a plurality of pre-approved locations the GPS location falls within.

34. The method of claim 33, wherein a risk score is calculated for the proffered promissory payment based upon risk factors associated with the pre-approved location if it is determined that the GPS location falls within the pre-approved location.

35. The method of claim 33, wherein a risk score is calculated for the proffered promissory payment based upon new risk factors associated with the GPS location when the GPS location does not fall within a pre-approved location.

36. A method of determining the risk of accepting a proffered payment, the method comprising:

assigning a remote transaction device to a traveling merchant, wherein a change in location associated with the traveling merchant effects a change in location of the remote transaction device;

determining a distal GPS (Global Positioning System) location of the remote transaction device with a GPS signal, wherein the remote transaction device sends transaction information about the proffered payment to an authorizing host;

sending the transaction information and the distal GPS location information to the authorizing host;

performing a risk assessment of accepting the proffered payment based upon the transaction information and the distal GPS location information, wherein the risk assessment is adjusted when the location of the remote transaction device is not within at least one of a plurality of authorized locations the traveling merchant travels to in order to conduct transactions; and sending a signal back to the remote transaction device indicative of whether the proffered payment is to be accepted or declined.

37. The method of claim 36, wherein determining the location of the remote transaction device comprises receiving the GPS signal and determining a GPS based location of the remote transaction device.

38. The method of claim 36, wherein performing a risk assessment of accepting the proffered payment comprises determining whether the GPS based location is in at least one pre-approved location for the remote transaction device.

39. The method of claim 38, wherein determining whether the GPS based location is in the at least one pre-approved location comprises determining whether the GPS based location is within a region defined by a pre-approved zip code for the remote transaction device.

40. The method of claim 38, wherein performing the risk assessment further comprises determining a risk score of accepting the proffered payment based upon the GPS information, the information about the merchant, the amount of the proffered payment, and the type of transaction to determine the risk score.

41. The method of claim 40, wherein the risk score is adjusted based upon whether the GPS information is within a pre-approved location for the remote transaction device.

42. The method of claim 38, wherein performing the risk assessment of accepting the proffered payment comprises determining whether the GPS based location is in the at least one pre-approved location and comprises determining which of a plurality of pre-approved locations the GPS location falls within.

43. The method of claim 42, wherein a risk score is calculated for the proffered payment based upon risk factors associated with the pre-approved location if it is determined that the GPS location falls within the pre-approved location.

44. The method of claim 42, wherein a risk score is calculated for the proffered payment based upon new risk factors associated with the GPS location when the GPS location does not fall within a pre-approved location.

45. The method of claim 36, wherein determining the risk of accepting a proffered payment includes determining the risk of accepting a proffered promissory payment.

46. The method of claim 45, wherein determining the risk of accepting a proffered promissory payment includes determining the risk of accepting a payment by check.

47. A system for determining the risk of accepting a proffered payment, the system comprising:

a means for determining a distal GPS (Global Positioning System) location of at least one remote transaction device assigned to a traveling merchant, wherein a change in location associated with the traveling merchant effects a change in location of the at least one remote transaction device, wherein the at least one remote transaction device sends transaction information about the proffered payment to an authorizing host;

a means for sending the transaction information and the distal GPS location information to the authorizing host;

a means for performing a risk assessment of accepting the proffered payment based upon the transaction information and the distal GPS location information, wherein the risk assessment is adjusted when the location of the remote transaction device is not within at least one of a plurality of authorized locations the traveling merchant travels to in order to conduct transactions; and a means for sending a signal back to the at least one remote transaction device indicative of whether the proffered payment is to be accepted or declined.

48. The system of claim 47, wherein the means for determining the location of the at least one remote transaction device includes a GPS receiver that receives GPS signals and determines the location coordinates of the at least one remote transaction device based upon the GPS signal.

49. The system of claim 48, wherein the means for performing a risk assessment includes a risk assessment component that evaluates the risk associated with the financial transaction, wherein the risk assessment component adjusts the risk assessment based upon the location information received from the at least one remote transaction device.

50. The system of claim 49, wherein the risk assessment component categorizes an approved location for the at least one remote transaction device, wherein the risk assessment component performs a standard risk assessment when the location information indicates that the at least one remote transaction device is at the approved location.

51. The system of claim 50, wherein the risk assessment component adjusts the risk assessment when the location information indicates that the at least one remote transaction device is not in the approved location by evaluating risk factors associated with the new location.

52. The system of claim 51, wherein the risk factors for the new location include payment history on other proffered payments in the same location.

53. The system of claim 49, wherein the means for performing a risk assessment categorizes a plurality of approved locations for the at least one remote transaction device wherein a merchant can move the at least one remote transaction device from one location to another.

54. The system of claim 53, wherein the risk assessment component declines transactions when the location information provided by the at least one remote transaction device indicates the at least one remote transaction device is not in one of the plurality of approved locations.

55. The system of claim 53, wherein the plurality of approved locations are defined as a region in which the GPS coordinates provided by the at least one remote transaction device must fall within.

56. The system of claim 55, wherein the means for performing a risk assessment has a data structure associated therewith that maps zip codes to GPS coordinates wherein the authorization host can determine if a GPS coordinate falls within a particular zip code and wherein the approved location for the at least one remote transaction device is defined in terms of approved zip codes.

57. The system of claim 47, wherein the remote transaction device comprises a plurality of remote transaction devices.

58. The system of claim 47, wherein the transaction information is selected from the group consisting of store number, identification number, clerk number, transaction number, date, dollar amount, check information, cash information, and GPS information.

* * * * *